(12) United States Patent
Vandal et al.

(10) Patent No.: US 8,506,752 B2
(45) Date of Patent: Aug. 13, 2013

(54) TECHNIQUES FOR MOUNTING BRACKETS TO GLASS SUBSTRATES FOR AUTOMOTIVE APPLICATIONS

(75) Inventors: Robert A. Vandal, Syracuse, IN (US);
Duane O. Recker, Auburn, IN (US);
Keith Aldrich, Waterloo, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 30 days.

(21) Appl. No.: 13/064,726

(22) Filed: Apr. 11, 2011

(65) Prior Publication Data
US 2012/0255665 A1 Oct. 11, 2012

(51) Int. Cl.
*C09J 4/00* (2006.01)
(52) U.S. Cl.
USPC ........................................ 156/330; 248/475.1
(58) Field of Classification Search
USPC ........................................ 156/330; 248/475.1
See application file for complete search history.

(56) References Cited

U.S. PATENT DOCUMENTS

| | | | |
|---|---|---|---|
| 3,499,744 A | | 3/1970 | Tolliver et al. |
| 4,425,717 A | * | 1/1984 | Marcus ............................ 33/361 |
| 5,173,766 A | * | 12/1992 | Long et al. ..................... 257/687 |
| 5,281,852 A | * | 1/1994 | Normington .................. 257/685 |
| 5,368,943 A | * | 11/1994 | Baghdachi et al. ......... 428/423.1 |
| 5,587,236 A | | 12/1996 | Agrawal et al. |
| 6,350,791 B1 | * | 2/2002 | Feichtmeier et al. ........... 522/81 |
| 7,871,664 B2 | | 1/2011 | O'Connor et al. |
| 2009/0101208 A1 | | 4/2009 | Vandal et al. |
| 2010/0090086 A1 | * | 4/2010 | Zinser et al. ................... 248/476 |
| 2010/0107505 A1 | | 5/2010 | Schreiner et al. |
| 2010/0229853 A1 | | 9/2010 | Vandal et al. |

FOREIGN PATENT DOCUMENTS

| | | |
|---|---|---|
| DE | 103 60 826 A1 | 7/2005 |
| DE | 10 2004 061 362 A1 | 2/2006 |

OTHER PUBLICATIONS

European Search Report mailed Jul. 26, 2012.

* cited by examiner

*Primary Examiner* — Katarzyna Wyrozebski Lee
*Assistant Examiner* — Scott W Dodds
(74) *Attorney, Agent, or Firm* — Nixon & Vanderhye P.C.

(57) ABSTRACT

Certain example embodiments relate to techniques for bonding automotive brackets for sensors, rear view mirrors, and/or other components to an interior surface of the glass. The adhesive films of certain example embodiments may be film-based adhesives that may be die-cut and pre-applied to the brackets or components. They may have a good initial adhesion or green strength immediately upon contact with the glass. In certain example instances, the films may be applied and successfully bond to the glass at near ambient temperature conditions to a strength level adequate to meet operational specifications for the component in under 72 hours.

12 Claims, 7 Drawing Sheets

TECHNIQUES FOR MOUNTING BRACKETS TO GLASS SUBSTRATES FOR AUTOMOTIVE APPLICATIONS

Certain example embodiments of this invention relate to techniques for mounting brackets to glass substrates, e.g., for automotive applications. More particularly, certain example embodiments of this invention relate to techniques for bonding automotive brackets for sensors, rear view mirrors, and/or other components to an interior surface of the glass.

BACKGROUND AND SUMMARY OF EXAMPLE EMBODIMENTS OF THE INVENTION

Rear view mirror, rain sensor, and other brackets for mounting of such components conventionally have been bonded to the interior surface of automotive glass using films made of materials such as polyvinyl butyral (PVB), structural epoxy, and silicones.

These typical bonding materials are applied using conventional techniques and are known to have specific needs in terms of, for example, temperature and time to achieve cure and, hence, the requisite level of bond strength. It therefore in the past has been advantageous and commonplace in the automotive glass industry to apply such brackets at a stage in the glass lamination process that precedes the autoclaving process, as the vast majority of automotive laminated glass requires autoclaving as a part of the normal product flow. As is known, autoclaving involves processing at elevated temperatures and pressures. The adhesives used on the brackets thus may be cured to achieve the desired bond characteristics within the autoclave process, which occurs downstream of the initial application.

There is an ever-increasing trend today to add more sensors and brackets to automotive glass. These sensors oftentimes are added to the front windshield in the top central area. These sensors include items such as, for example, rear view mirrors, rain sensors, multifunction cameras, collision avoidance sensors, lane departure cameras, and the like. In an effort to consolidate these sensors, many automotive original equipment manufacturers (OEMs) have developed large brackets designed to accept the mounting of all of the sensors in one unit. The reasoning is that consolidating the plural sensors into one large bracket may help reduce (and possibly even completely avoid) the need to bond many separate entities and the concomitant need to deal with the tolerance stack-ups of all of the separate components.

The autoclaving process involves loading the glass components onto racks with an air separation between them to promote even heating. The process is executed as a batch, which helps increase the use of the interior space of the autoclave, e.g., towards a theoretical maximum capacity. Unfortunately, the advent of much larger bracketry to be attached to the glass causes the spacing between parts to be significantly enlarged, thereby reducing the density of parts in the autoclave for a given cycle and, in turn, resulting in a net reduction of process throughput. As autoclaves are a high capital cost item, it becomes clear that reducing the density of parts in a batch may result in a prohibitive cost increase to the product.

Because of this problem, the majority of these larger brackets are applied in dedicated assembly processes after autoclaving and during the final assembly of the glass component. The change in the process flow means that the same adhesive systems are no longer applicable, as one cannot duplicate the high temperature and high pressure conditions of the autoclave. Without this process, and for reasons specific to each adhesive, the required bond strength may not be achieved or the cure time may be excessively long and thus not effectively manageable within a high volume process.

These large brackets now are oftentimes applied with wet adhesive systems such as moisture cure polyurethane or two part reactive cure materials. Unfortunately, these materials generally do not have an immediate grip or "green strength" as applied so the brackets, have tight positional tolerances, must be either clamped during cure or secured temporarily by tapes over the top or in selected positions on the surface contacting the glass, etc. Furthermore, the additional tape steps cause added cost and have an inherent risk of placement slip of the component.

Thus, it will be appreciated that there is a need in the art for improved techniques for bonding automotive brackets for sensors, rear view mirrors, and/or other components to an interior surface of the glass, especially where large type brackets are involved.

Certain example embodiments of this invention relate to a method of bonding a bracket to a vehicle windshield. The bracket is applied to the vehicle windshield, with the bracket having a die-cut film-based adhesive pre-applied to one or more mating surfaces thereof. The film-based adhesive is allowed to cure at a temperature at or near ambient so as to bond the bracket to the vehicle windshield. The film-based adhesive has an immediate green strength adequate to fully locate the bracket during subsequent curing of the adhesive. The film-based adhesive on the bracket is applied to the vehicle windshield at a temperature at or near ambient.

Certain example embodiments of this invention relate to a method of bonding a bracket to a vehicle windshield. The bracket supports a rear view mirror and/or one or more sensors. The bracket is applied to the vehicle windshield, with the bracket having a die-cut film-based adhesive pre-applied to each of a plurality of spaced apart mating surfaces thereof. The film-based adhesive is allowed to cure so as to bond the bracket to the vehicle windshield, with any curing being completed to a desired strength level within 72 hours. The film-based adhesive on the bracket is applied to the vehicle windshield and allowed to cure at a temperature at or near ambient. The film-based adhesive has an immediate green strength adequate to fully locate the bracket during subsequent curing of the adhesive.

Certain example embodiments of this invention relate to a system for bonding a bracket to a vehicle windshield. The bracket supports a rear view mirror and/or one or more sensors. The bracket is applied to the vehicle windshield at a temperature at or near ambient via a die-cut film-based adhesive pre-applied to each of a plurality of spaced apart mating surfaces thereof. The film-based adhesive is curable to a desired strength level at a temperature at or near ambient within 72 hours of application to the vehicle windshield. The film-based adhesive has an immediate green strength adequate to fully locate the bracket during subsequent curing of the adhesive.

According to certain example embodiments, the film-based adhesive is an epoxy-based film that, prior to said applying, is to be stored in a refrigerated condition to retard curing. The epoxy-based film is blanked in a cold state to the bracket prior to said applying. A cure cycle of the epoxy-based film is activatable by warming the epoxy-based film to ambient temperature. The bracket and/or vehicle windshield is warmed to ambient temperature or a temperature slightly higher than ambient temperature prior to application.

According to certain example embodiments, the film-based adhesive is a moisture cured urethane based film that, prior to said applying, is to be stored in a dry environment.

The moisture cured urethane based film includes a tacky surface to promote initial adhesion upon contact. After application, the moisture cured urethane based film is exposed to an elevated humidity to promote curing.

According to certain example embodiments, the film-based adhesive is a urethane adhesive film such as that typically used to laminate glass to polycarbonate. The urethane adhesive film is activatable or bondable at temperatures only slightly above ambient. The film-based adhesive is cured to a strength level adequate to meet operational specifications for the component in under 72 hours.

The features, aspects, advantages, and example embodiments described herein may be combined to realize yet further embodiments.

DETAILED DESCRIPTION OF THE INVENTION

Certain example embodiments of this invention relate to large brackets for holding sensors, rear view mirrors, and/or other elements that are mounted to vehicle windshield interiors. In certain instances, these brackets are able to resist loading and pass some structural testing of bond strength per typical automotive OEM specifications. In certain example embodiments, a film-based adhesive with a sufficiently high immediate green strength is provided to help ensure positive placement and location of the brackets following autoclaving. The film-based adhesives preferably include a reasonable cure time under ambient or near ambient conditions to provide a finished part meeting the specified structural bonding specifications of the automotive OEM.

With conventional or smaller brackets, adhesives typically have been applied as one piece of film in one location or a few locations very near each other and were cured in the autoclave process.

Figure 1:
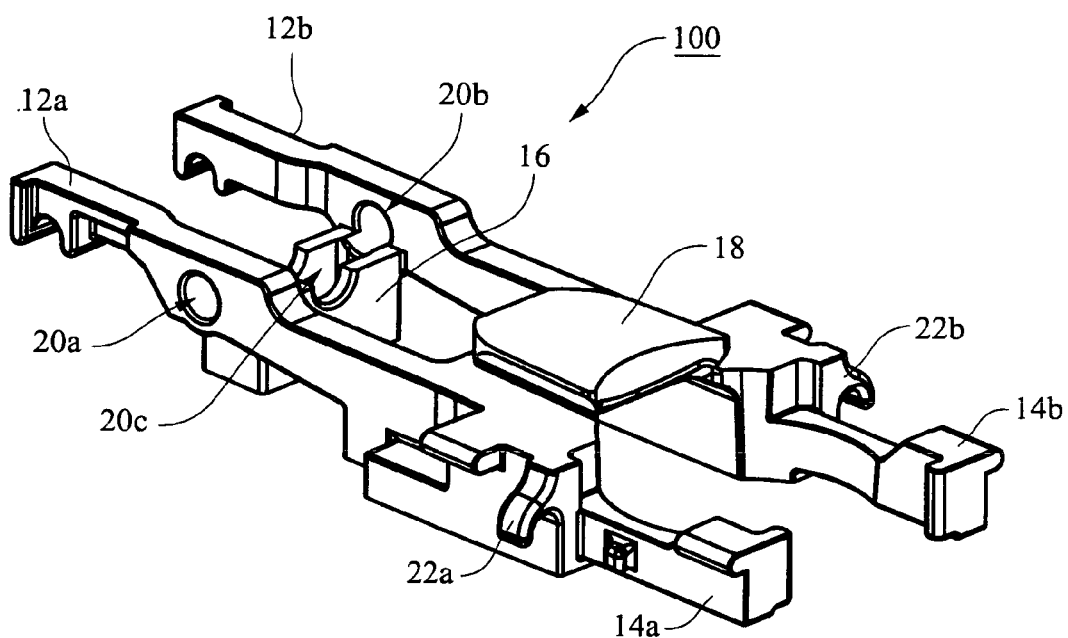
FIG. 1 is a partial perspective view of an example enlarged bracket for connecting a rear view mirror and optionally other components to a vehicle windshield that may be used in certain example embodiments.
Figure 2:
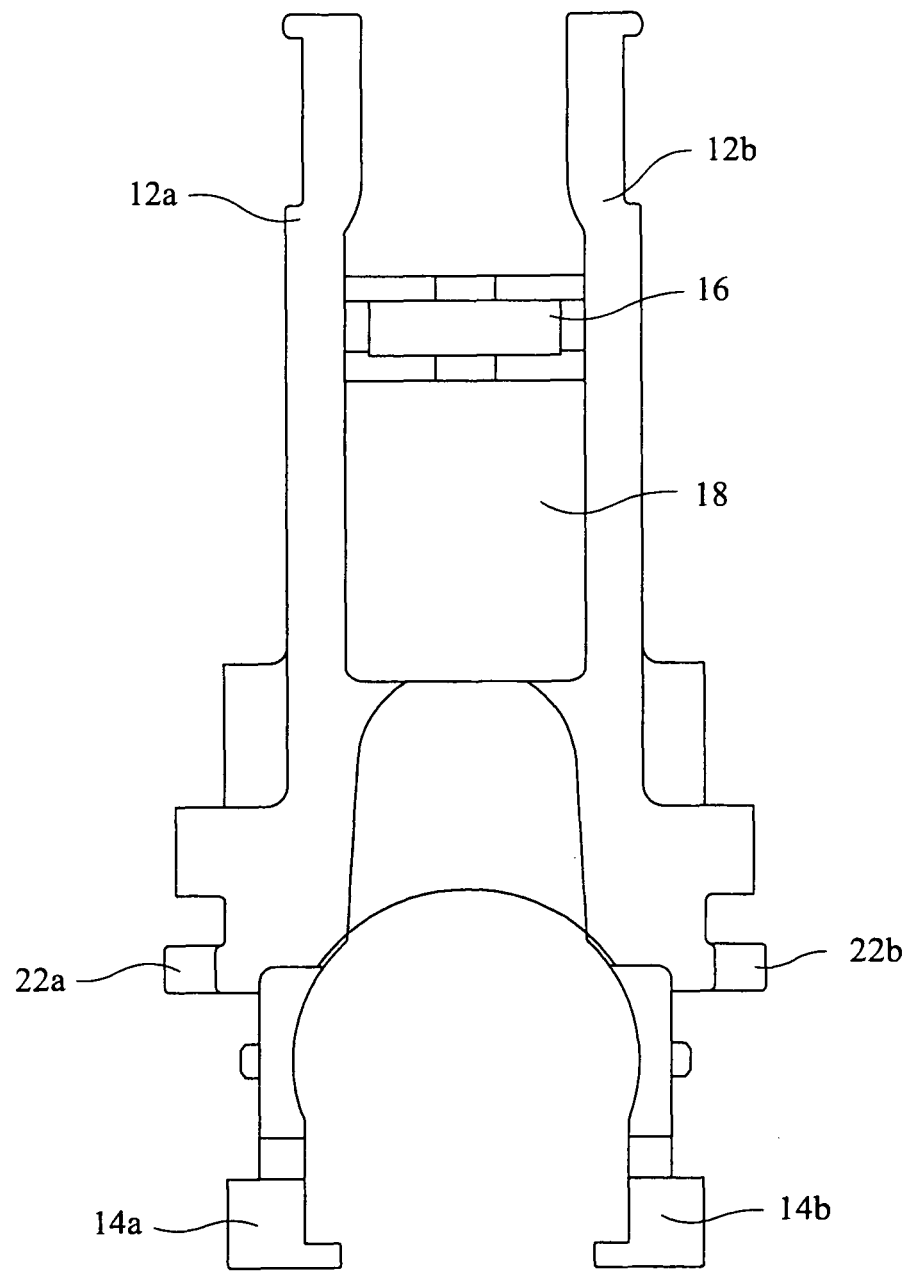
FIG. 2 is a top view of the example enlarged bracket of FIG. 1.
Figure 3:
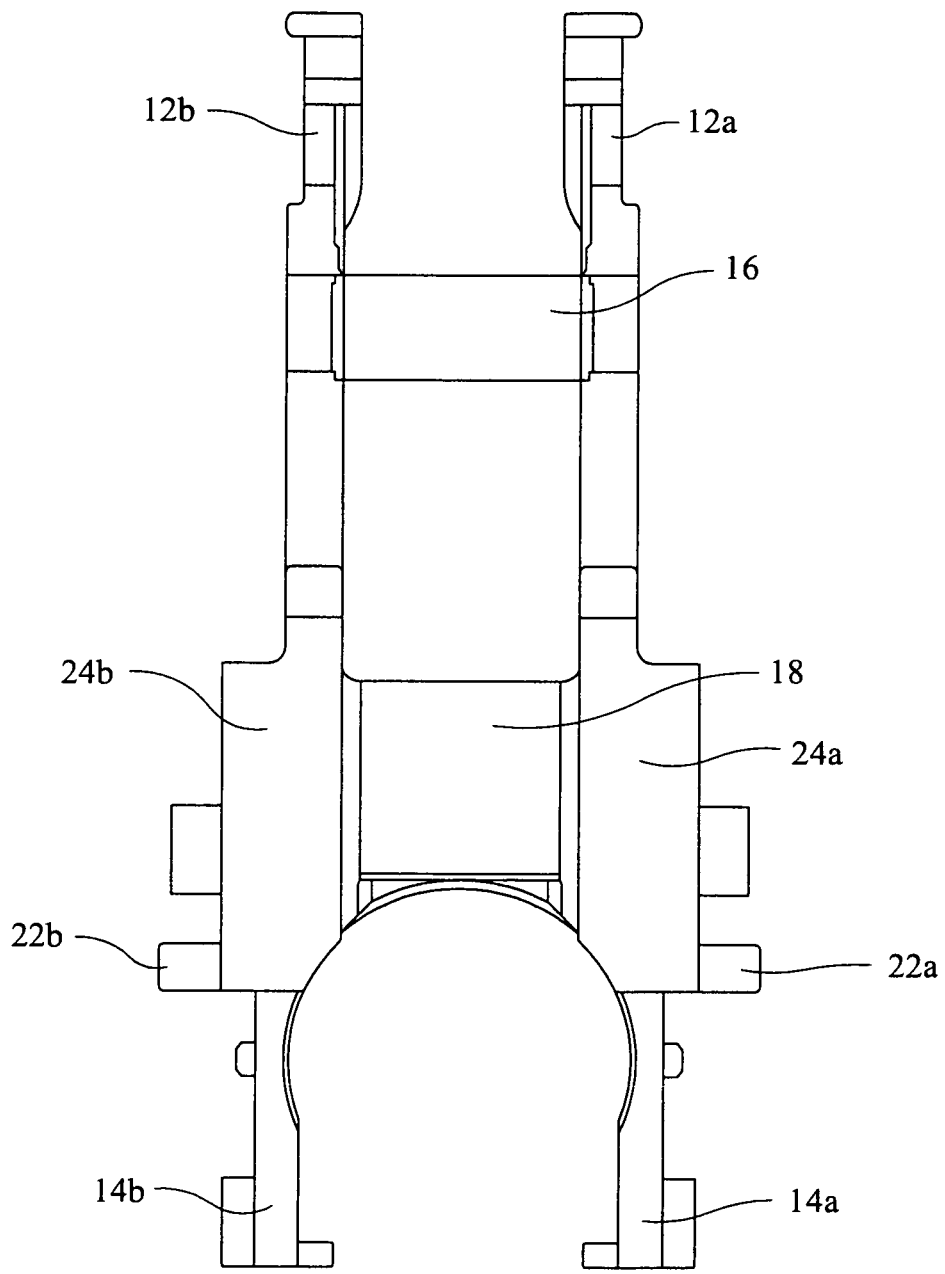
FIG. 3 is a bottom view of the example enlarged bracket of FIG. 1.

Referring now more particularly to the drawings in which like components are identified with like reference numerals throughout the several views, FIGS. 1-3 are views of an example enlarged bracket for connecting a rear view mirror and optionally other components to a vehicle windshield that may be used in certain example embodiments. More particularly, FIG. 1 is a partial perspective view of the example enlarged bracket, FIG. 2 is a top view of the example enlarged bracket, and FIG. 3 is a bottom view of the example enlarged bracket.

As shown in FIGS. 1-3, the enlarged bracket 100 includes first and second arms 12a and 12b at a first end thereof, and first and second arms 14a and 14b at a second end thereof. The arms 12a-b and 14a-b are shaped to support the various components that are to be held in place by virtue of the bracket 100. Thus, as show in FIG. 1, for example, the first and second arms 12a and 12b include concave recesses. A first bridge portion 16 connects the first and second arms 12a and 12b and, as described in greater detail below, provides a first mating surface for bonding the bracket 100 to the substrate. A second bridge portion 18 is curved when viewed in cross section and may receive the cylindrical or tubular portion that extends from the outside-facing portion of a rear view mirror (away from the viewers) and telescopes into the vehicle cabin. Holes 20a and 20b in the first and second arms 12a and 12b are arranged to accommodate electrical and/or other leads, e.g., in the event that a sensor or other electronic module is to receive power, transmit/receive signals, etc. Similarly, hole 20c in the first bridge portion 16 may be arranged to accommodate electrical and/or other leads.

Trim cover attachment features 22a and 22b are provided to shoulder portions of the first and second legs 12a and 12b. These attachment features 22a and 22b may help conceal the bracket from the inside of the cabin and provide a more aesthetically pleasing appearance of the rear view mirror while also concealing other electronics and/or sensors.

As alluded to above, one or more surfaces may be provided on a bottom side of the bracket 100 so as to facilitate its connection with the glass substrate that makes up the vehicle windshield. In the FIG. 3 example embodiment, for example, first and second mating surfaces 24a and 24b are provided "below" the shoulder portions of the first and second arms 12a and 12b, respectively. Mating surface 16a also is provided on an "underside" of the bridge portion 16. As discussed in greater detail below, mating surfaces may have a film applied thereto for facilitating the connection between the bracket and the windshield.

Figure 4:
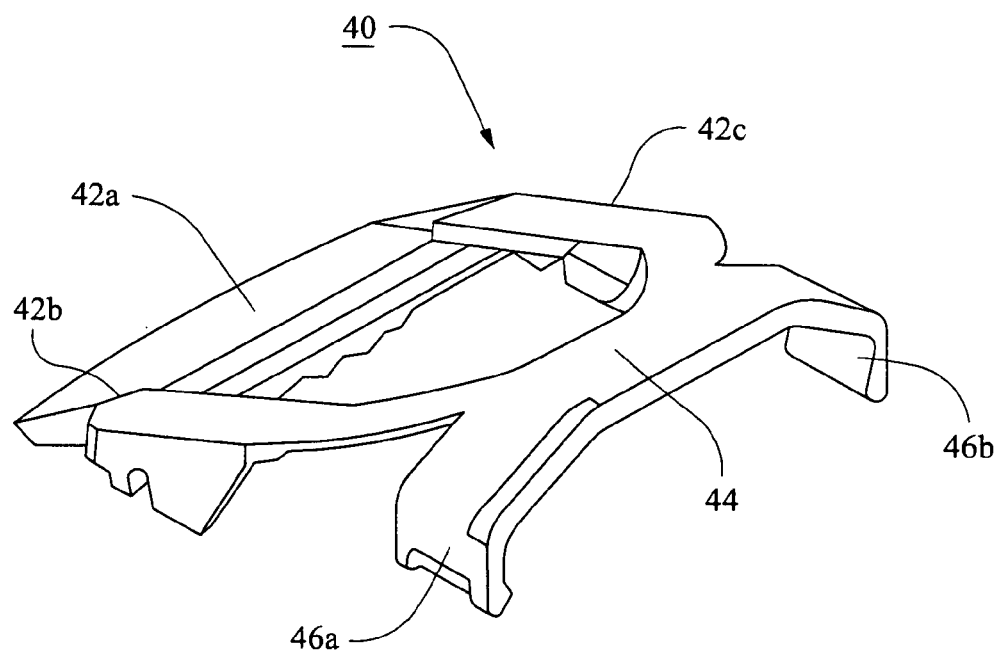
FIG. 4 is an isometric view of an example bracket adapted to hold a lane departure camera that may be used in certain example embodiments.
Figure 5:
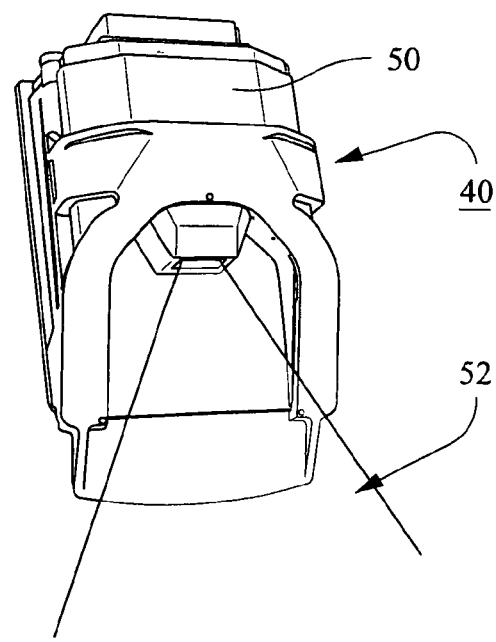
FIG. 5 shows an example camera mounted in the example bracket of FIG. 4.

FIG. 4 is an isometric view of an example bracket 40 adapted to hold a lane departure camera that may be used in certain example embodiments. The example bracket 40 in FIG. 4 includes adhesive surfaces 42a-c. The upper support 44 holds the camera and includes first and second arms 46a and 46b with barbs on their ends for further securing the camera to the bracket 40. FIG. 5 shows an example camera 50 mounted in the example bracket 40 of FIG. 4. The field of vision 52 also is shown in FIG. 5. The example shown and described in connection with FIGS. 4-5 may be provided by KL Glass, although it will be appreciated that other camera mounting brackets may be used in connection with different example embodiments of this invention.

Figure 6:
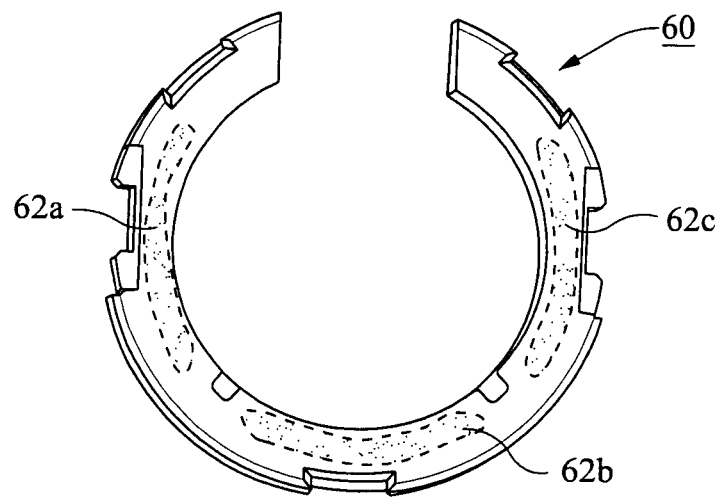
FIG. 6 is a view of an example rain sensor mounting bracket that may be used in certain example embodiments.

FIG. 6 is a view of an example rain sensor mounting bracket 60 that may be used in certain example embodiments. FIG. 6 shows the bracket 60 as if viewed from the inside of the vehicle. The adhesive material may be applied in several areas around the perimeter of the more flat, back side (not shown). Three such adhesive areas 62a-c are shown in the FIG. 6 example, although more or fewer may be used in different implementations. The example shown and described in connection with FIG. 6 may be provided by KL Glass (e.g., under the PF RS bracket name), although it will be appreciated that other rain sensor mounting brackets may be used in connection with different example embodiments of this invention.

Figure 7:
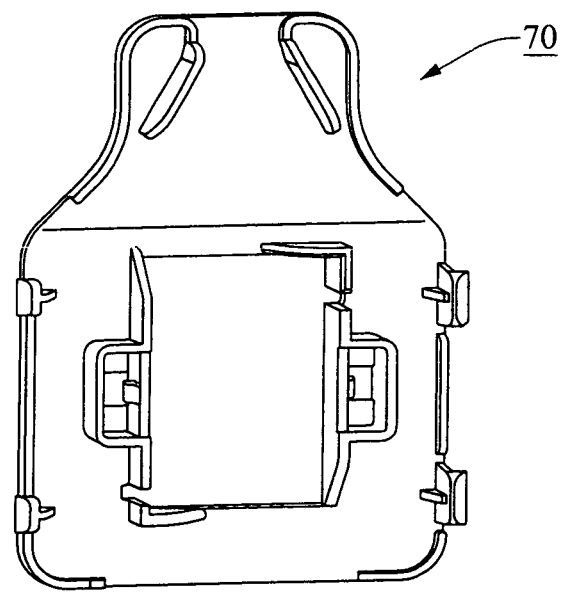
FIG. 7 is a view of an example humidity sensor mounting bracket that may be used in certain example embodiments.

FIG. 7 is a view of an example humidity sensor mounting bracket 70 that may be used in certain example embodiments.

FIG. 7 shows the bracket 70 as if viewed from the inside of the vehicle. The adhesive material may be applied in several areas around the perimeter of the more flat, back side, e.g., in patches (not shown), around the full flat surface, etc., depending on the seal requirements. The example shown and described in connection with FIG. 7 may be provided by KL Glass (e.g., under the PF HS bracket name), although it will be appreciated that other humidity mounting brackets may be used in connection with different example embodiments of this invention.

Figure 8:
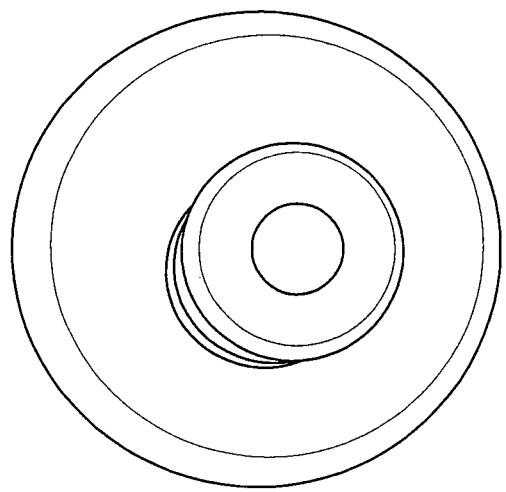
FIGS. 8-9 are views of a rear wiper grommet that may be used in certain example embodiments.
Figure 9:
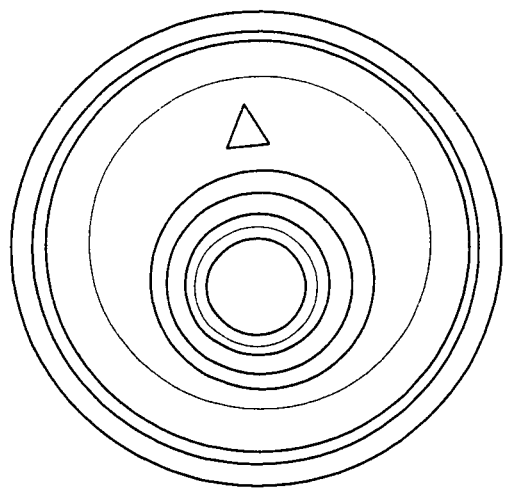

FIGS. 8-9 are views of a rear wiper grommet that may be used in certain example embodiments. FIGS. 8 and 9 show the grommet from the vehicle exterior and interior, respectively. The adhesive material may be applied to the all or parts (e.g., in strips or other configurations) of the flat inner surface shown in FIG. 9, for example. The example shown and described in connection with FIGS. 8-9 may be provided by KL Glass, although it will be appreciated that other humidity mounting brackets may be used in connection with different example embodiments of this invention.

Figure 10:
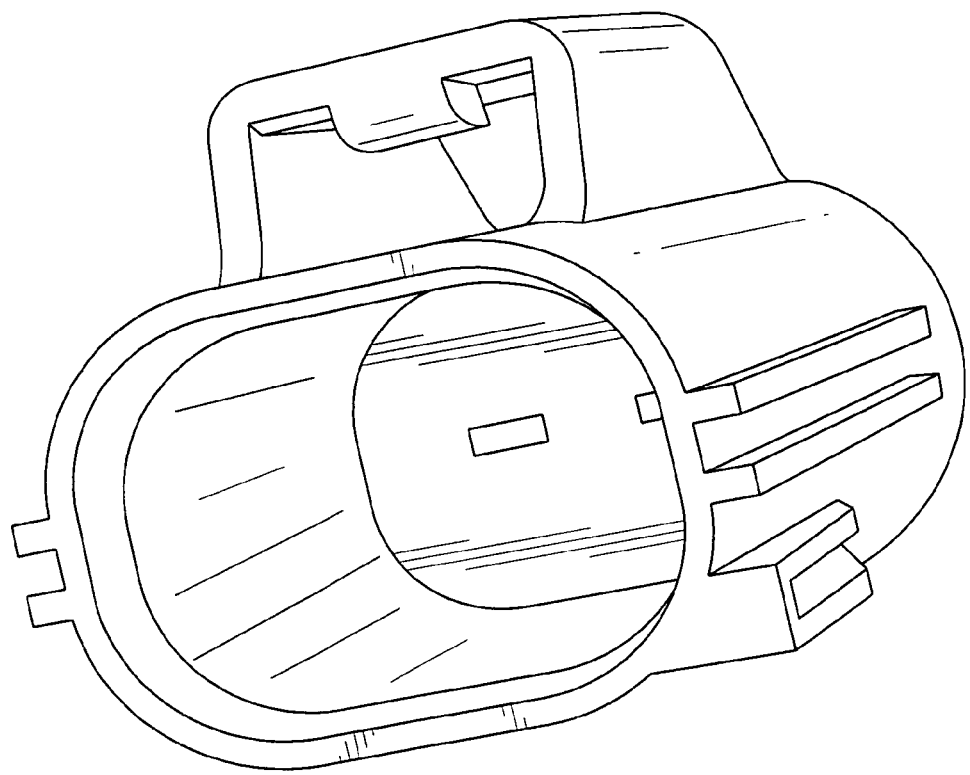
FIG. 10 is a partial perspective view of an example wire/terminal seal that may be used in certain example embodiments.

FIG. 10 is a partial perspective view of an example wire/terminal seal that may be used in certain example embodiments. The example shown in FIG. 10 may be bonded to the glass via any one or more suitable flat surfaces. As shown in FIG. 10, one or more channels and/or through holes may be provided for accommodating wires and/or terminals in different implementations. The example shown and described in connection with FIG. 10 may be provided by Yazaki, although it will be appreciated that other humidity mounting brackets may be used in connection with different example embodiments of this invention.

The larger brackets used in connection with certain example embodiments involve a post-autoclave solution. They also are much larger and in certain example embodiments include multiple bonding contact locations or feet. The feet may be spaced relatively far apart, e.g., in the order of 50-150 mm in certain example instances. Given that these large brackets are made of materials other than glass such as, for example, sintered metals, cast aluminum, injection-molded hard thermoplastics, etc., it would be desirable to take into consideration the differences in coefficients of thermal expansion (CTEs) between the brackets and the glass component over the operating range of temperature, which is typically approximately −40 to +85 degrees C.

Thermal expansion in itself is another reason why bonding of large brackets within the autoclave process may not be desirable, as the typical curing temperature in the autoclave is approximately 150 degrees C. (about 300 degrees F.) which, in turn, results in a rigid bond at high temperature that is then permanently stressed by dissimilar contraction of the materials to ambient temperature. In this case, the cold operating limit may then provide a condition of highest and perhaps unacceptable stress. In contrast with the high temperatures involved during autoclaving, bonding at a temperature nearer to the midpoint of the operating range may be advantageous in terms of reducing the stresses on the bonds that may be caused by thermal expansion or contraction. Thus, certain example embodiments may involve bonding at a temperature of about 0-100 degrees C., more preferably about 10-75 degrees C., and still more preferably about 20-25 degrees C.

As a result, many of the most common adhesive systems that are heat cured or heat activated are disadvantageous for the types of applications contemplated herein.

Ambient temperature bonding may be achieved using many liquid or paste systems comprising wet urethanes (e.g., moisture cure or two-part urethanes), silicones, and the like. However, these systems are disadvantageous in that they offer no immediate bond strength upon contact and thus instead require temporary clamping or taping to temporarily hold position while the bonding adhesive cures. In many cases, pressure sensitive adhesive tape is selectively placed on the bond surface, wet adhesive is placed in the bonding areas not covered by this tape, and the part is applied. The result is that the pressure sensitive tape sections temporarily hold the component while the structural adhesive cures. As will be appreciated, this approach has elevated material and process costs and risks failure if the pressure sensitive tape areas are contaminated with the wet adhesive during the application or wet-out process. In contrast, certain example embodiments do not involve clamping or taping to serve locating, temporary positioning, or other purposes.

The adhesive films for post-autoclave attachment of large brackets may possess certain example attributes. First, the adhesive films of certain example embodiments may be film-based adhesives that may be die-cut and pre-applied to the brackets or components.

Second, the adhesive films of certain example embodiments may have a good initial adhesion or green strength immediately upon contact with the glass. This adhesion in certain example instances preferably is adequate to fully locate the bracket during any remaining cure of the adhesive. Thus, as indicated above, further clamping, taping, or the like, may not be necessary in certain example embodiments.

Third, the adhesive films of certain example embodiments may be applied to the glass at near ambient temperature conditions and also successfully bond at the same or similar temperatures.

Fourth, the adhesive films of certain example embodiments may cure to a strength level adequate to meet operational specifications for the component in under 72 hours at ambient temperature. Specific humidity conditions (e.g., high/elevated or low/reduced humidity conditions) may be provided to meet such example target bonding times.

Fifth, the adhesive films of certain example embodiments may involve an adhesion promoter layer on the glass or bracket surface. For instance, adhesion may be facilitated by fully or partially coating the surface(s) on the glass and/or the bracket with a material applied via, for example, e-coating, anodizing, etc. In certain example embodiments, a powder coat may be used to promote adhesion.

There are several potential adhesives that may meet the above-described example design criteria. Although there are potentially more, identified below are three candidate materials that may be selected for each application based on their compatibility with the bracket material and the relative total cost of material and processing for the application.

The list of candidate materials includes, for example, an epoxy-based film that would be stored in a refrigerated condition to retard curing. It may be blanked in a cold state to the brackets. The assembly (e.g., the bracket and/or vehicle windshield) may be warmed to ambient or slightly higher than ambient temperature prior to application to the glass. The cure cycle in such cases may occur at or around ambient temperature and may be activated by warming to the ambient temperature. Of course, other materials may involve different temperatures and/or times, some of which may be above ambient (such as, for example, heating to approximately 180 degrees F. or about 85 degrees C. for 10 minutes after application). L&L Adhesives currently manufactures a currently unnamed epoxy-based film that is suitable for use in connection with certain example embodiments, although other epoxy-based films with the same or similar properties and/or compositions may of course be used in different embodiments of this invention.

The list of candidate materials also includes, for example, a moisture cured urethane based film that is stored in a dry environment to reduce or prevent curing. This film may have a tacky surface to promote initial adhesion upon contact. After application, it may be exposed to a sufficiently high humidity to promote curing. Adhezion currently manufactures a urethane film that is suitable for use in connection with certain example embodiments, and Rapidex is another example hot melt adhesive that may be used in connection with certain example embodiments, although other moisture cured urethane based films with the same or similar properties and/or compositions may of course be used in different embodiments of this invention.

The list of candidate materials also includes, for example, a urethane adhesive film such as that typically used to laminate glass to polycarbonate. This film may be activated or bonded at temperatures only slightly above ambient. Huntsman's Krystalflex is a commercially available urethane adhesive film that is suitable for use in connection with certain example embodiments, although other urethane adhesive films with the same or similar properties and/or compositions may of course be used in different embodiments of this invention.

Although an example large bracket has been described herein, the example techniques disclosed herein may be used in connection with other types of large brackets for holding a plurality of elements. Furthermore, although certain example embodiments are described as relating to large brackets that resist loading and pass structural testing of bond strength, the example techniques described herein may be applied to other brackets including, for example, smaller brackets for holding only one or a few of the same or different components, brackets that are not intended to bear a significant load in service, brackets that are not required to pass structural adhesive tests and standards, etc. Still further, although an example bracket was shown and described in connection with FIGS. 1-3, other bracket designs are of course possible in different embodiments of this invention. Such alternative bracket designs may have one, two, three, or any number of mating surfaces, e.g., as appropriate for the design of the bracket and the mounting requirements often imposed by OEMs.

While certain example embodiments have been discussed in connection with front windshields for automotive applications, the example techniques herein may be applied with respect to rear windshields, side windshields, sun/moon roofs, etc. The example techniques used herein also may be applicable to non-automotive applications including residential or commercial farm or construction equipment, or any application where it is desirable to bond large brackets of the materials described herein to glass. Such further applications may include, for example, solar photovoltaic applications.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of bonding a bracket to a vehicle windshield, the method comprising:
    applying the bracket to the vehicle windshield, the bracket having a die-cut film-based adhesive pre-applied to one or more mating surfaces thereof; and
    allowing the film-based adhesive to cure at a temperature at or near ambient so as to bond the bracket to the vehicle windshield, wherein:
    the film-based adhesive has an immediate green strength adequate to fully locate the bracket during subsequent curing of the adhesive,
    the film-based adhesive on the bracket is applied to the vehicle windshield at a temperature at or near ambient, and
    the film-based adhesive is an epoxy-based film that, prior to said applying, is to be stored in a refrigerated condition to retard curing.

2. The method of claim 1, wherein the bracket comprises a plurality of mating surfaces that are spaced apart from one another.

3. The method of claim 2, wherein at least some of the mating surfaces are feet that are spaced apart by 50-150mm.

4. The method of claim 1, wherein the bracket is made of sintered metals, cast aluminum, and/or injection-molded hard thermoplastics.

5. The method of claim 1, wherein the bonding occurs at a temperature of about 20-25degrees C.

6. The method of claim 1, wherein clamps and tapes are not used to hold the bracket in position while the film-based adhesive cures.

7. The method of claim 1, wherein an adhesion promoter layer is provided on the vehicle windshield and/or on a surface of the bracket.

8. The method of claim 1, wherein the epoxy-based film is blanked in a cold state to the bracket prior to said applying.

9. The method of claim 1, further comprising warming the bracket and/or vehicle windshield to ambient temperature or a temperature slightly higher than ambient temperature prior to said applying.

10. The method of claim 1, wherein a cure cycle of the epoxy-based film is activatable by warming the epoxy-based film to ambient temperature.

11. The method of claim 1, wherein the film-based adhesive is cured to a strength level adequate to meet operational specifications for the component in under 72hours.

12. A method of bonding a bracket to a vehicle windshield, the bracket supporting a rear view mirror and/or one or more sensors, the method comprising:
    applying the bracket to the vehicle windshield, the bracket having a die-cut film-based adhesive pre-applied to each of a plurality of spaced apart mating surfaces thereof; and
    allowing the film-based adhesive to cure so as to bond the bracket to the vehicle windshield, any curing being completed to a desired strength level within 72hours;
    the film-based adhesive on the bracket being applied to the vehicle windshield and allowed to cure at a temperature at or near ambient;
    the film-based adhesive having an immediate green strength adequate to fully locate the bracket during subsequent curing of the adhesive, wherein:
    the film-based adhesive is an epoxy-based film that, prior to said applying, is to be stored in a refrigerated condition to retard curing;
    the epoxy-based film is blanked in a cold state to the bracket prior to said applying;
    a cure cycle of the epoxy-based film is activatable by warming the epoxy-based film to ambient temperature; and further comprising:

warming the bracket and/or vehicle windshield to ambient temperature or a temperature slightly higher than ambient temperature prior to said applying.

* * * * *